US012134266B2

(12) United States Patent
Kawano

(10) Patent No.: US 12,134,266 B2
(45) Date of Patent: Nov. 5, 2024

(54) INKJET RECORDING APPARATUS

(71) Applicant: KYOCERA Document Solutions Inc., Osaka (JP)

(72) Inventor: Daichi Kawano, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 144 days.

(21) Appl. No.: 18/059,814

(22) Filed: Nov. 29, 2022

(65) Prior Publication Data

US 2023/0166494 A1 Jun. 1, 2023

(30) Foreign Application Priority Data

Nov. 30, 2021 (JP) ................................ 2021-194058

(51) Int. Cl.
*B41J 2/045* (2006.01)
*B41J 2/07* (2006.01)

(52) U.S. Cl.
CPC ............. *B41J 2/04501* (2013.01); *B41J 2/07* (2013.01)

(58) Field of Classification Search
CPC ........ B41J 29/38; B41J 29/387; B41J 29/393; B41J 2/04501; B41J 2/07
See application file for complete search history.

(56) References Cited

U.S. PATENT DOCUMENTS 6,375,297 B1 * 4/2002 Hayashi .................. B41J 11/20 347/14
2002/0167568 A1 * 11/2002 Sakuma .................. B41J 2/055 347/68
2014/0009524 A1 * 1/2014 Ogawa .................. B41J 2/2135 347/12

FOREIGN PATENT DOCUMENTS

JP 2005029337 * 2/2005 ............. B41J 13/00
JP 2020-069648 A 5/2020

* cited by examiner

*Primary Examiner* — Kristal Feggins
(74) *Attorney, Agent, or Firm* — Stein IP, LLC

(57) ABSTRACT

An inkjet recording apparatus includes a conveyance portion, a recording head, a detection portion, and a control portion. The recording head is disposed opposite the conveyance portion, and includes a plurality of nozzles which eject ink to the recording medium conveyed by the conveyance portion. The detection portion detects the thickness of the recording medium. The control portion controls the ink ejection speed from the recording head based on the thickness of the recording medium detected by the detection portion.

4 Claims, 3 Drawing Sheets

INKJET RECORDING APPARATUS

INCORPORATION BY REFERENCE

This application is based on and claims the benefit of priority from Japanese Patent Application No. 2021-194058 filed on Nov. 30, 2021, the contents of which are hereby incorporated by reference.

BACKGROUND

The present disclosure relates to an inkjet recording apparatus.

Inkjet recording apparatuses include a recording head which records images by ejecting ink to a recording medium such as a sheet. In inkjet recording apparatuses, to keep satisfactory image quality and satisfactory image recording productivity, it is necessary to keep a suitable distance between the recording medium conveyed to a position opposite the recording head and the recording head which ejects ink to the recording medium.

SUMMARY

An inkjet recording apparatus according to one aspect of the present disclosure includes a conveyance portion, a recording head, a detection portion, and a control portion. The conveyance portion conveys a recording medium. The recording head is disposed opposite the conveyance portion, and includes a plurality of nozzles which eject ink to the recording medium conveyed by the conveyance portion. The detection portion detects the thickness of the recording medium. The control portion controls the operation of the recording head and the conveyance portion. The control portion controls the ink ejection speed from the recording head based on the thickness of the recording medium detected by the detection portion.

BRIEF DESCRIPTION OF THE DRAWINGS

FIG. 2 is a plan view around a recording portion in the inkjet recording apparatus in

FIG. 1.

DETAILED DESCRIPTION

Hereinafter, an embodiment of the present disclosure will be described with reference to the drawings. The present disclosure is not limited to the following description.

Figure 1:
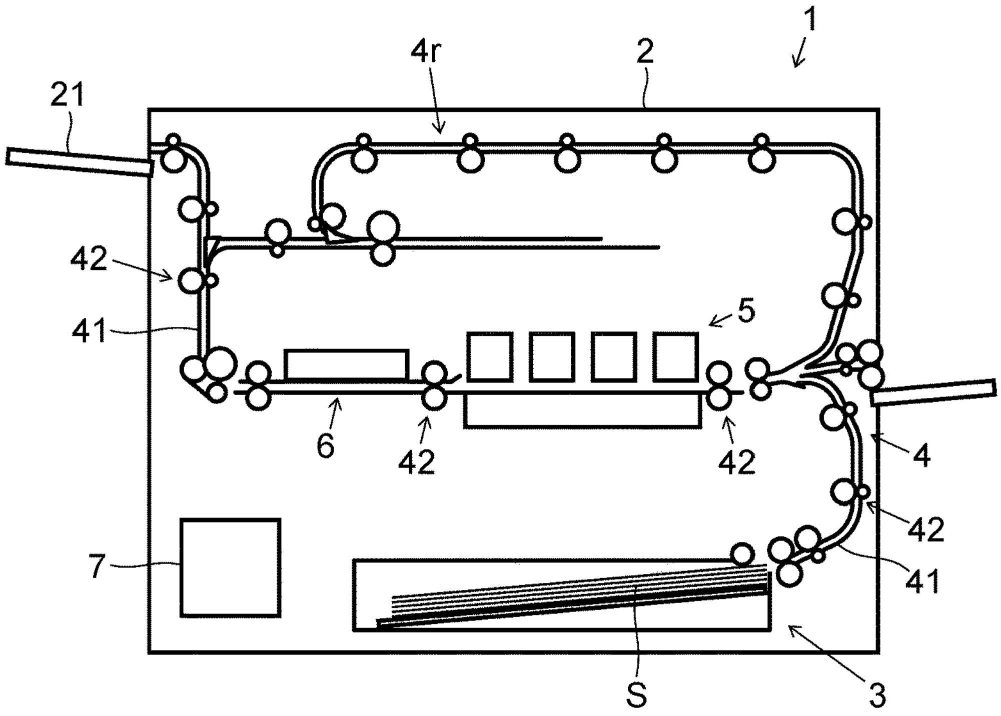
FIG. 1 is a schematic sectional front view of an inkjet recording apparatus according to one embodiment of the present disclosure.
Figure 2:
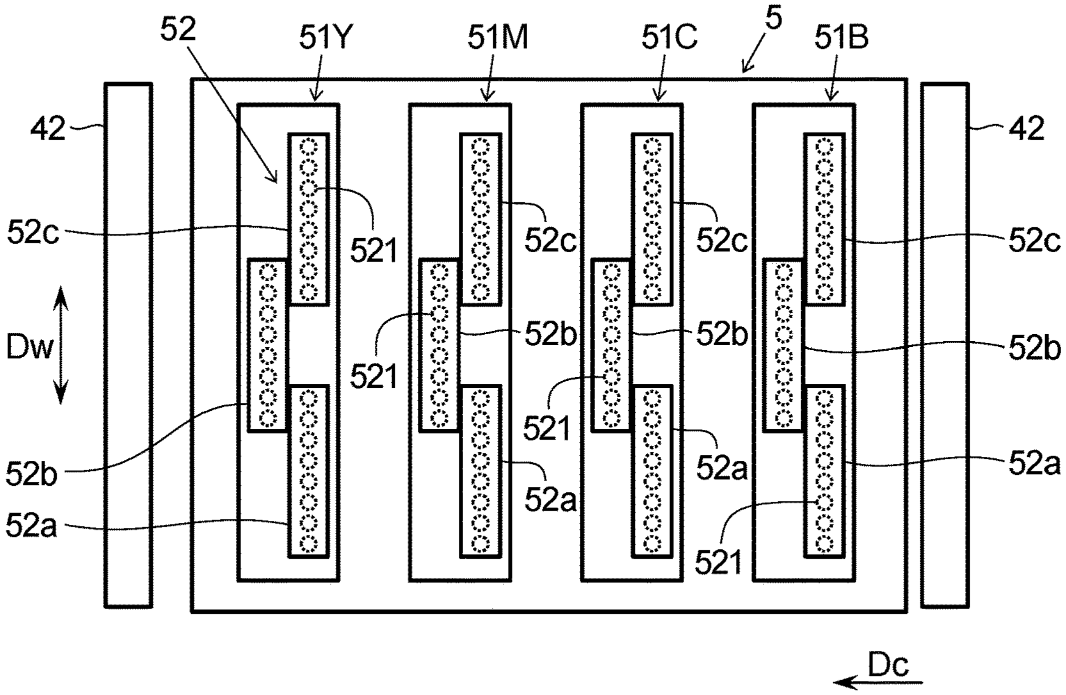
Figure 3:
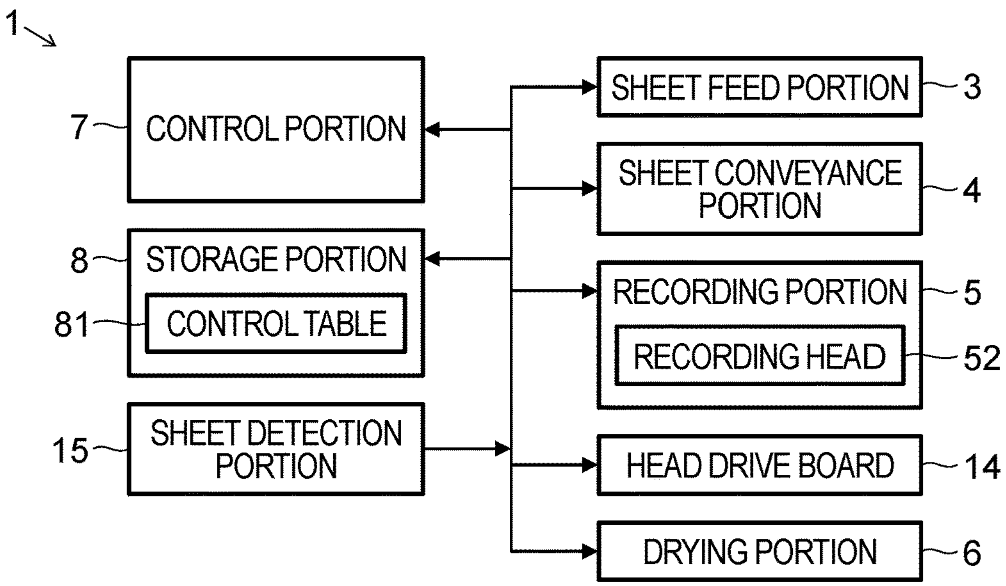
FIG. 3 is a block diagram showing the schematic configuration of the inkjet recording apparatus in FIG. 1.

FIG. 1 is a schematic sectional front view of an inkjet recording apparatus 1 according to an embodiment. FIG. 2 is a top view around a recording portion 5 in the inkjet recording apparatus 1 in FIG. 1. FIG. 3 is a block diagram showing a schematic configuration of the inkjet recording apparatus 1 in FIG. 1. The inkjet recording apparatus 1 is, for example, an inkjet recording printer. The inkjet recording apparatus 1 includes, as shown in FIGS. 1, 2, and 3, an apparatus main body 2, a sheet feed portion 3, a sheet conveyance portion (conveyance portion) 4, a recording portion 5, a drying portion 6, and a control portion 7.

The sheet feed portion 3 is disposed, for example, in a lower part of the apparatus main body 2. The sheet feed portion 3 stores a plurality of sheets (a recording medium) S and, during recording, separates and feeds out the sheets S one by one.

The sheet conveyance portion 4 is disposed downstream of the sheet feed portion 3 in the sheet conveyance direction and conveys a sheet S fed out from the sheet feed portion 3. The sheet conveyance portion 4 conveys the sheet S to the recording portion 5 and then to the drying portion 6 and then, after recording and drying, discharges the sheet S to a sheet discharge portion 21. The sheet conveyance portion 4 includes a guide member 41 and a pair of conveyance rollers 42 which are disposed along a sheet conveyance passage.

The sheet conveyance portion 4 includes a reversing conveyance portion **4*r*. When duplex recording is performed, the sheet conveyance portion 4 distributes the sheet S after recording and drying on the first side to a reversing conveyance portion 4*r* and then conveys the sheet S having its conveyance direction switched and having its obverse and reverse sides reversed back to the recording portion 5 and the drying portion 6**.

The recording portion 5 is located downstream of the sheet feed portion 3 in the sheet conveyance direction and is disposed opposite the sheet conveyance portion 4. The recording portion 5 is disposed above the sheet conveyance portion 4, at a predetermined interval from it. That is, the recording portion 5 faces the sheet S conveyed by the sheet conveyance portion 4.

The recording portion 5 holds head units 51B, 51C, 51M, and 51Y corresponding to four colors, namely black, cyan, magenta, and yellow respectively. The head units 51B, 51C, 51M, and 51Y are arranged side by side along the sheet conveyance direction Dc so that their longitudinal direction is parallel to the sheet width direction Dw, which is orthogonal to the sheet conveyance direction Dc. The four head units 51B, 51C, 51M, and 51Y have a similar basic configuration, and accordingly, unless necessary, the suffixes "B", "C", "M", and "Y" for distinction may be omitted in the following description.

The head units 51 for the different colors each include line inkjet recording heads 52. In each of the head units 51 for the different colors, a plurality of recording heads 52 (for example, three (**52*a*, 52*b*, 52*c***)) are arranged in a staggered array along the sheet width direction Dw.

The recording head 52 includes a plurality of ink ejection nozzles 521 at its bottom. The plurality of ink ejection nozzles 521 are arranged in rows along the sheet width direction Dw so as to be able to eject ink over the entire recording area on the sheet S. That is, the recording head 52 includes a plurality of ink ejection nozzles 521 which eject ink onto the sheet S conveyed by the sheet conveyance portion 4. The recording portion 5 ejects ink sequentially from the recording heads 52 of the head units 51B, 51C, 51M, and 51Y corresponding to the four colors to the sheet S conveyed by the sheet conveyance portion 4 and records a full-color or monochrome image on the sheet S.

The drying portion 6 is disposed downstream of the recording portion 5 in the sheet conveyance direction. While the sheet S on which the ink image has been recorded in the recording portion 5 is conveyed by the sheet conveyance portion 4, the ink is dried.

The control portion 7 includes a CPU and other electronic circuits and components (of which none are illustrated). Based on control data and programs stored in a storage portion 8, the CPU controls the operation of different components in the inkjet recording apparatus 1 to perform processes related to the functions of the inkjet recording apparatus 1. The sheet feed portion 3, the sheet conveyance portion 4, the recording portion 5, and the drying portion 6 individually receive instructions from the control portion 7 and performs recording on the sheet S in coordination.

The storage portion 8 is composed of a combination of a nonvolatile storage device such as a program ROM (read-only memory), a data ROM, and the like and a volatile storage device such as a RAM (random-access memory).

Figure 4:
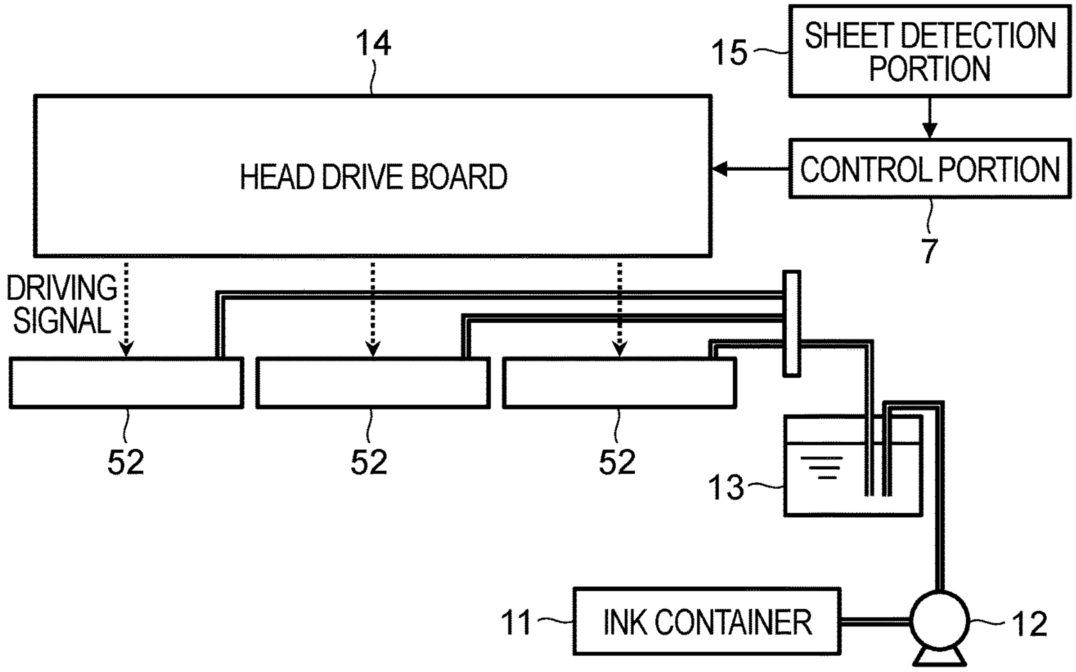
FIG. 4 is a diagram showing the configuration of a control system and an ink feed system around the recording portion in the inkjet recording apparatus in FIG. 1.

Next, the configuration around the recording portion 5 will be described with reference to FIG. 4. FIG. 4 is a diagram showing the configuration of a control system and an ink feed system around the recording portion 5 in the inkjet recording apparatus 1 in FIG. 1. The inkjet recording apparatus 1 includes an ink container 11, an ink feed pump 12, a sub-tank 13, a head drive board 14, and a sheet detection portion (detection portion) 15.

The ink container 11 is provided removably with respect to the apparatus main body 2. The ink container 11 stores ink to be fed to the sub-tank 13. Then, ink is conveyed from the ink container 11 to the recording heads 52 via the sub-tank 13.

The ink feed pump 12 is disposed downstream of the ink container 11 in the ink conveyance direction. The ink feed pump 12 sucks the ink in the ink container 11 and ejects it towards the sub-tank 13. The operation of the ink feed pump 12 is controlled by the control portion 7.

The sub-tank 13 stores ink to be fed to the recording heads 52. The sub-tank 13 is provided with an ink amount sensor (not illustrated). The control portion 7 controls the ink feed pump 12 and controls the amount of ink fed from the ink container 11 to the sub-tank 13 based on the driving time of the ink feed pump 12. If the amount of ink in the sub-tank 13 detected by the ink amount sensor does not exceed a predetermined value even after the driving time of the ink feed pump 12 has exceeded a certain period of time, the control portion 7 judges that the amount of ink in the ink container 11 is zero. The amount of ink in the sub-tank 13 is controlled such that the water head difference with the recording heads 52 remains constant.

The head drive board 14 transmits a driving signal to the recording heads 52. The recording heads 52 includes driving elements (not illustrated) for ink ejection nozzles 521. The head drive board 14 transmits a driving signal with a predetermined driving waveform and a predetermined driving voltage to the driving elements for the ink ejection nozzles 521. The driving waveform for the driving elements for the ink ejection nozzles 521 is prepared in advance according to the gradation values of the pixels (dots) of the image to be recorded with ejected ink droplets. The control portion 7 controls the head drive board 14 to change the ejection speed of the ink ejected from the recording heads 52. In this way, the control portion 7 controls the operation of the recording heads 52 to record an image on the sheet S.

The sheet detection portion 15 is disposed, for example, downstream of the sheet conveyance portion 3 in the sheet conveyance direction. The sheet detection portion 15 is what is called, for example, a media sensor or a sheet type sensor. It includes an optical sensor, a piezoelectric element, a rotary encoder, and the like, and detects the type of the sheet S, such as its thickness. That is, the sheet detection portion 15 detects the thickness of the sheet S.

The sheet detection portion 15 may detect the thickness of the sheet S as a result of the user entering the type of the sheet S on an operation panel (not illustrated) provided, for example, at the front of the apparatus main body 2. Or, the sheet detection portion 15 may detect the thickness of the sheet S based on information as to the type of the sheet S as included in image data and recording instructions related to image recording that the inkjet recording apparatus 1 receives from an external computer or the like across a network via a communication portion (not illustrated).

The control portion 7 controls the ejection speed of the ink ejected from the recording heads 52 based on the thickness of the sheet S detected by the sheet detection portion 15. With this configuration, if the distance between the sheet S and the recording heads 52 changes due to the thickness of the sheet S, it is possible to suppress displacement of landing positions of ink droplets. Thus, it is possible to achieve high-quality image recording even in a configuration where the distance between the sheet S and the recording heads 52 cannot be adjusted freely.

The control portion 7 increases the ink ejection speed from the recording heads 52 as the thickness of the sheet S detected by the sheet detection portion 15 decreases. With this configuration, the ink ejection speed from the recording heads 52 is controlled to increase as the thickness of the sheet S decreases and the distance between the sheet S and the recording heads 52 increases. Thus, it is possible to suppress displacement of landing positions of ink droplets according to the thickness of the sheet S, thereby to achieve high-quality image recording.

Figure 5:
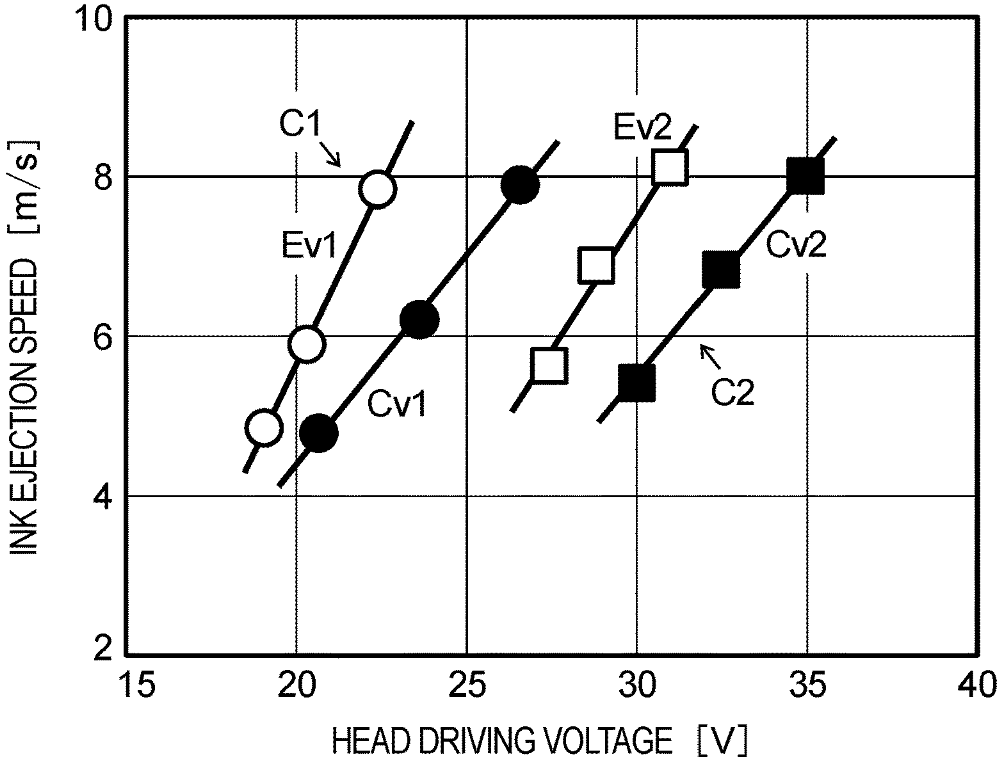
FIG. 5 is a graph showing the relationship of the driving voltage for recording heads with the ink ejection speed.

FIG. 5 is a graph showing the relationship of the driving voltage for the recording heads 52 with the ink ejection speed. FIG. 5 shows the ink ejection speed as the driving voltage is changed in three steps, for each of two driving conditions C1 and C2 for the ink ejection nozzles 521. For each of the driving conditions C1 and C2, Ev1 and Ev2 respectively represent results of verification by experiment, and Cv1 and Cv2 respectively represent results of verification by simulation.

FIG. 5 reveals that the driving voltage for the ink ejection nozzles 521 and the ink ejection speed are in a proportional relationship. Thus, the control portion 7, by adjusting the driving voltage for the recording heads 52, controls the ink ejection speed from the recording heads 52. That is, by adjusting the driving voltage for each driving condition according to the thickness of the sheet S, it is possible to freely control the ink ejection speed from the recording heads 52.

Figure 6:
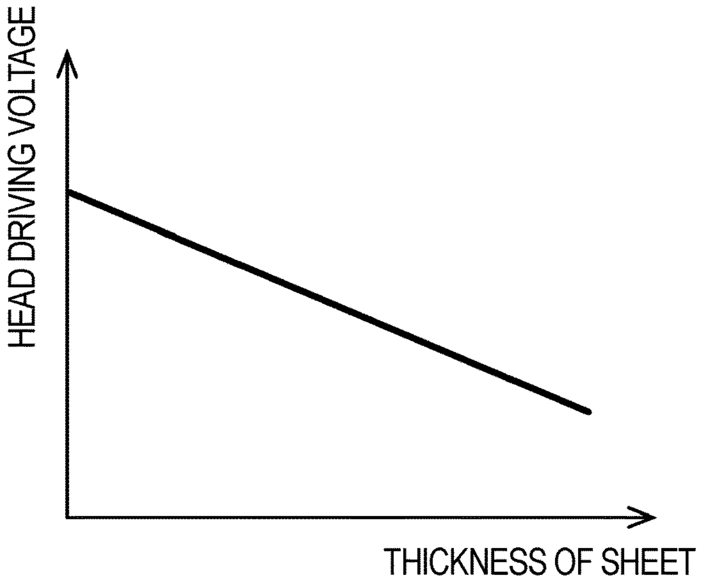
FIG. 6 is a graph showing the relationship of the thickness of the sheet with the driving voltage for the recording heads.

As shown in FIG. 5, increasing the driving voltage for the ink ejection nozzles 521 results in increasing the ink ejection speed from the recording heads 52. That is, the control portion 7 increases the driving voltage for the ejection nozzles 52 as the ink ejection speed increases. In other words, as shown in FIG. 6, the control portion 7 increases the driving voltage for the ink ejection nozzles 521 as the thickness of the sheet S detected by the sheet detection portion 15 decreases. FIG. 6 is a graph showing the relationship of the thickness of the sheet S with the driving voltage for the recording heads 52.

With the configuration described above, the ink ejection speed from the recording heads 52 is controlled so as to increase as the thickness of the sheet S decreases and the distance between the sheet S and the recording heads 52 increases. It is thus possible to suppress displacement of landing positions of ink droplets according to the thickness of the sheet S, thereby to achieve high-quality image recording.

The storage portion 8 stores a control table (table) 81 defining the relationship of the thickness of the sheet S with the ink ejection speed (see FIG. 3). Table 1 shows one example of the control table 81.

TABLE 1

| Sheet Thickness [mm] | Head Driving Voltage Correction Value [V] |
|---|---|
| 0.26- | ±0 |
| 0.16-0.25 | +1 |
| 0.11-0.15 | +2 |
| -0.10 | +3 |

Table 1 defines the thickness of the sheet S and the corresponding correction value for the driving voltage for the recording heads 52 as the ink ejection speed. According to Table 1, for example, with standard copying paper (about 0.09 mm thick) used on the inkjet recording apparatus 1, the correction value for the driving voltage for the recording heads 52 is +3V, and the ink ejection nozzles 521 are controlled at +3V with respect to the normal driving voltage. By contrast, as the thickness of the sheet S increases, the correction value of the driving voltage for the recording heads 52 decreases and the driving voltage for the recording heads 52 itself decreases. While one example of the correction value for the driving voltage has been mentioned, that is not meant to limit the correction value for the driving voltage, which can be adjusted as necessary according to the relationship of the ink to be used with the recording heads.

The control portion 7 refers to the control table 81 stored in the storage portion 8 during image recording to the sheet S. Specifically, the control portion 7 refers to the control table 81 stored in the storage portion 8 and acquires the ink ejection speed corresponding to the thickness of the sheet S detected by the sheet detection portion 15. In other words, the control portion 7 refers to the control table 81 to acquire the driving voltage for the recording heads 52 corresponding to the thickness of the sheet S.

With the configuration described above, by using the control table 81 stored in the storage portion 8, it is possible to control the ink ejection speed from the recording heads 52 easily.

The viscosity of ink changes depending on the ambient temperature of the inkjet recording apparatus 1. A higher ambient temperature makes ink less sticky, with lower viscosity; a lower ambient temperature makes ink stickier, with higher viscosity. For this reason, the driving voltage for the recording heads 52 may be adjusted based on the ambient temperature of the inkjet recording apparatus 1. For example, when the viscosity of ink is low, compared to when the viscosity of ink is high, the driving voltage for the recording heads 52 are set low. Then, a control table defining the relationship between the ambient temperature of the inkjet recording apparatus 1 and the driving voltage for the recording heads 52 may be stored in the storage portion 8 in advance.

While an embodiment of the present disclosure has been described above, it is not meant to limit the scope of the present disclosure, which thus encompasses any modifications made without departure from the scope and sense equivalent to those claims.

What is claimed is:

1. An inkjet recording apparatus comprising:

a conveyance portion that conveys a recording medium;

a recording head disposed opposite the conveyance portion, the recording head including a plurality of nozzles which eject ink to the recording medium conveyed by the conveyance portion;

a detection portion that detects a thickness of the recording medium; and a control portion that controls an operation of the recording head and the conveyance portion, wherein the control portion increases an ejection speed of the ink ejected from the recording head as the thickness of the recording medium detected by the detection portion decreases.

2. The inkjet recording apparatus according to claim 1, further comprising:

a storage portion that stores a table defining a relationship of the thickness of the recording medium with the ink ejection speed, wherein the control portion refers to the table stored in the storage portion and acquires the ink ejection speed corresponding to the thickness of the recording medium detected by the detection portion.

3. The inkjet recording apparatus according to claim 1, wherein the control portion, by adjusting a driving voltage for the recording head, controls the ink ejection speed from the recording head.

4. The inkjet recording apparatus according to claim 3, wherein the control portion increases the driving voltage for the recording head as the ink ejection speed increases.

* * * * *